United States Patent Office 2,901,432
Patented Aug. 25, 1959

2,901,432

COPOLYMERS OF PROPYLENE AND PIPERYLENE AS GREASE THICKENERS

Arnold J. Morway, Clark, Charles W. Seelbach, Cranford, and Delmer L. Cottle, Highland Park, N.J., assignors to Esso Research and Engineering Company, a corporation of Delaware No Drawing. Application October 26, 1956
Serial No. 618,433

5 Claims. (Cl. 252—59)

This invention relates to lubricating compositions containing copolymers of propylene and piperylene. Particularly, the invention relates to lubricating greases containing a grease thickener prepared by copolymerizing propylene and piperylene in the presence of a catalyst consisting of a mixture of a reducing agent and a reducible metal compound.

Prior to this invention, it has been found that propylene and other olefins such as ethylene and isobutylene, may be polymerized at relatively low pressures, i.e. pressures below about 1000 p.s.i.g. as compared with pressures of the order of 1000 atmospheres as used in older more conventional high pressure polymerization processes. These low pressure polymerizations have been carried out in the presence of a catalyst mixture consisting of various combinations of reducing metals or reducing metallo-organic compounds with various reducible metal compounds.

However, polyisobutylene prepared by this low pressure technique is unsatisfactory as a grease thickener as it will not form solid greases. Greases thickened with low pressure polyethylene have poor adhesion to both wet and dry metal surfaces and spatter when subjected to shock, which properties limit their use in many applications. Greases thickened with low pressure polypropylene result in a ropy cohesive lubricant, which has a low adhesiveness to metal surfaces and which is difficult to dispense in normal grease lubricating equipment. It has been previously found that this somewhat overly cohesive condition of polypropylene could be lessened by the incorporation of metal soaps, such as aluminum or lithium stearates. However, it has now been found and forms the subject of this invention that greases having good adhesion to both wet and dry surfaces and which are not exceedingly cohesive can be prepared by using as the thickening agent a low pressure copolymer of piperylene and propylene.

The catalyst mixture used to prepare the low pressure copolymer of propylene and piperylene generally contains a molar ratio of reducing agent to the reducible metal compound in the range of about 1:1 to 12:1, e.g. 3:1 to 8:1. Reducing agents which may be used include alkali and alkaline earth metals, their hydride and alloys; aluminum compounds, such as aluminum hydride, aluminum alkyls, e.g. trialkyls, alkyl aluminum halides, etc. Reducible heavy metal compounds which may be used include halides, acetyl acetonates, etc., of heavy metals of groups IV-B, V-B and VI-B of the periodic system as shown on pages 58–59 of Lange's Handbook of Chemistry, 7th ed., 1949. Examples of such metals include hafnium, thorium, uranium, vanadium, chromium, molybdenum, and particularly titanium and zirconium. Catalyst mixtures of the above type are known in the art.

The lubricating compositions of this invention will comprise a major proportion of a lubricating oil and a grease thickening proportion of a copolymer of propylene and piperylene. The copolymer will contain about 1 to 50 wt. percent, e.g. 5 to 30 wt. percent, piperylene, the balance of the copolymer being propylene. The copolymer will have a molecular weight in the range of 1,000 to 500,000, e.g. 30,000 to 200,000, and is prepared at low pressures in the presence of a catalyst comprising a reducing metal compound and a reducible metal compound.

The lubricating compositions of the invention will generally comprise about 2 to 12, e.g. 3 to 10 wt. percent of the copolymer in a lubricating oil which may be either a mineral oil or a synthetic oil. The grease compositions are simply prepared by dispersing the copolymer in the lubricating oil, generally at elevated temperatures such as 150° to 550° F., e.g. 200° to 450° F.

The synthetic lubricating oils include esters of monobasic acids (e.g. ester of $C_8$ Oxo alcohol with $C_8$ Oxo acid); esters of dibasic acids (e.g. di-2-ethyl hexyl sebacate); esters of glycols (e.g. $C_{13}$ Oxo acid diester of tetraethylene glycol); complex esters (e.g. the complex ester formed by reacting one mole of sebacic acid with two moles of tetraethylene glycol and two moles of 2-ethyl-hexanoic acid); esters of phosphoric acid (e.g. the ester formed by contacting three moles of the mono methyl ether of ethylene glycol with one mole of phosphorus oxychloride, etc.); halocarbon oils (e.g. the polymer of chlorotrifluoroethylene containing twelve recurring units of chlorotrifluoroethylene); alkyl silicates (e.g. methyl polysiloxanes, ethyl polysiloxanes, methyl-phenyl polysiloxanes, ethyl-phenyl polysiloxanes, etc.); sulfite esters (e.g. ester formed by reacting one mole of sulfur oxychloride with two moles of the methyl ether of ethylene glycol, etc.); carbonates (e.g. the carbonate formed by reacting $C_8$ Oxo alcohol with ethyl carbonate to form a half ester and reacting this half ester with tetraethylene glycol); mercaptals (e.g. the mercaptal formed by reacting 2-ethyl hexyl mercaptan with formaldehyde); formals (e.g. the formal formed by reacting $C_{13}$ Oxo alcohol with formaldehyde); polyglycol type synthetic oils (e.g. the compounds formed by condensing butyl alcohol with fourteen units of propylene oxide, etc.); or mixtures of any of the above in any proportions.

Various other additives may also be added to the grease composition (e.g. 0.1 to 10.0 wt. percent), for example, detergents such as calcium petroleum sulfonate; oxidation inhibitors such as phenyl alpha naphthylamine; viscosity index improvers such as polyisobutylene; corrosion inhibitors, such as sorbitan monooleate; pour depressants, dyes, other grease thickeners, and the like.

The invention will be more fully understood by reference to the following examples, which include the preferred embodiments of the invention.

EXAMPLE I

*Preparation of the catalyst*

The catalyst was prepared in a nitrogen atmosphere as follows:

10 ml. of a 0.169 molar solution of titanium tetrachloride in dry n-heptane was mixed with 20 ml. of a .253 molar solution of aluminum triethyl in dry n-heptane. A black precipitate formed. The resulting mixture or slurry was then added to a 300 ml. stainless steel micro bomb, the mixture being rinsed into the bomb with an additional 10 ml. of dry n-heptane.

*Preparation of the copolymer*

The micro bomb used in the preparation of the copolymer was a heavy stainless steel reactor, type 410 (13% Cr.) sealed with a copper gasket. Agitation was obtained by rocking the reactor back and forth during the reaction by means of an electric motor. A thermocouple well in the reactor made it possible to record temperatures throughout the run and to control temperature by means of a Celectray. Connected to the reactor by means of high pressure stainless steel tubing and a high pressure stainless steel valve was a stainless steel reservoir in which the propylene could be collected as a liquid. The reservoir, in turn, was connected to a cylinder of nitrogen by means of stainless steel tubing and valve, so that the liquid propylene could be forced into the reactor from the reservoir by means of nitrogen pressure.

10.3 ml. of piperylene was added to a previously evacuated one-liter gas holder. The piperylene was rinsed into the gas holder with 50 ml. of dry n-heptane. This operation was carried out in a nitrogen atmosphere in a dry box. The n-heptane solution of piperylene was then pressured into the steel reservoir under 80 p.s.i.g. nitrogen. The reservoir was then cooled in a Dry Ice-isopropanol bath to a temperature of about −94° F. About 70 grams of propylene was then condensed into the reservoir by measuring a total pressure drop of 350 p.s.i.g. from a 1.86 liter measuring bomb. The reservoir was then put under 400 p.s.i.g. nitrogen and the valve to the reactor was opened to thereby inject a cold mixture of the 7 grams of piperylene (10.3 ml.), the 70 grams of liquid propylene and the 50 ml. heptane into the reactor. The reactor pressure was then raised to 400 p.s.i.g. nitrogen and the contents were heated to 80° C. over 2 hours and maintained at this temperature for 90 hours. The bomb was then cooled to 30° C. and opened. The bomb was filled with isopropanol in order to deactivate the catalyst and to solubilize the catalyst residues. The contents were then filtered to remove the solid polymer which was then further washed twice with isopropanol. The solid polymer was then dried on a steam bath and finally dried in a vacuum at 70° C. The filtrate was evaporated on the steam bath and the residue was dried in a vacuum at 70° C. 36.4 grams of a tan granular solid and 1.3 grams of a brown grease were obtained, giving a catalyst efficiency of about 41 grams per gram total catalyst. The solid copolymer had a molecular weight (according to Harris relationship as described in J. Polymer Sci. 8, 361 (1952)) of 43,000 and an ash content of 0.30 wt. percent. This copolymer product was used in preparing the grease composition of the invention.

*Preparation of grease composition*

10 wt. percent of the copolymer was added to 90 wt. percent of a naphthenic type lubricating oil having a viscosity of 55 SSU at 210° F. This mixture was heated to 370° F. and maintained there for 30 minutes while agitating. The mixture was then allowed to cool to room temperature without further agitation.

EXAMPLE II

A grease similar to that of Example I was prepared except that 5 wt. percent of the copolymer was added to 95 wt. percent of the oil. Properties of the greases of Examples I and II are given in the following table.

TABLE 1

| Properties | Example I | Example II |
|---|---|---|
| Appearance | Excellent smooth uniform homogeneous product. | Excellent soft solid grease. |
| Dropping Point | 220° F | 180° F. |
| Penetrations, 77° F.mm./10: | | |
| Unworked | 250 | 350. |
| Worked 60 strokes | 275 | 370. |
| Worked 100,000 strokes | 280 | |
| Water Solubility | Nil | |
| Lincoln Gun Dispensing | Excellent | No tendency to fluidize on dispensing. |
| A. B. E. C. Lubrication Test: | | |
| 150° F. Test | No tendency to leak through bearing seal. | |
| 200° F. Test | No tendency to leak through bearing seal. No stringiness formed with resultant throwout from bearing. | |

While the greases of the invention have low dropping points which could preclude their use in many applications, they are suitable for low temperature lubrication, such as in automotive chassis lubrication. The grease of Example I was further tested in lubricating the front end suspension and chassis of a Buick automobile. The grease gave good retention and gave no squeaks or signs of fluidization over a 21-day period of use.

What is claimed is:

1. A lubricating grease composition comprising a major proportion of a lubricating oil and a grease thickening amount of a copolymer of propylene and piperylene containing about 1.0 to 50 wt. percent piperylene and 99 to 50.0 wt. percent propylene, said copolymer having a molecular weight within the range of about 1,000 to 500,000 and being prepared by copolymerizing at pressures below 1000 pounds per square inch in the presence of a catalyst comprising a mixture of a reducing metalloorgano compound and a reducible metal compound.

2. A lubricating grease composition according to claim 1, wherein said lubricating oil is a mineral oil, and said copolymer is present in amounts of 2 to 12 wt. percent based on the total composition.

3. A lubricating grease composition comprising a major proportion of a mineral lubricating oil and about 3 to 10 wt. percent of a copolymer of propylene and piperylene containing about 5 to 30 wt. percent piperylene and 95 to 70 wt. percent propylene, said copolymer having a molecular weight of about 30,000 to 200,000, and formed by copolymerizing at pressures below 1000 pounds per square inch in the presence of a catalyst comprising a mixture of a reducing metal compound and a reducible heavy metal compound.

4. A grease according to claim 3, wherein said reducing metal compound is an aluminum trialkyl and said reducible metal compound is a halide of a heavy metal of groups IV–B to VI–B of the periodic system.

5. A grease according to claim 4, wherein said aluminum trialkyl is aluminum triethyl and said reducible metal compound is titanium tetrachloride.

References Cited in the file of this patent

UNITED STATES PATENTS

| 2,109,772 | Frolich | Mar. 1, 1938 |
| 2,142,980 | Huijser et al. | Jan. 3, 1939 |
| 2,151,382 | Harmon | Mar. 21, 1939 |